United States Patent
Bellows

(10) Patent No.: US 6,973,291 B1
(45) Date of Patent: Dec. 6, 2005

(54) VEHICLE CRADLE SYSTEM AND METHODOLOGY FOR HAND HELD DEVICES

(75) Inventor: David E. Bellows, Holbrook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 537 days.

(21) Appl. No.: 10/034,508

(22) Filed: Dec. 28, 2001

(51) Int. Cl.[7] ............................................. H04B 1/38
(52) U.S. Cl. .................... 455/90.3; 455/99; 455/569.1; 455/569.2; 379/420.02; 379/426; 379/449; 379/454; 379/455; 235/462.43
(58) Field of Search ........................ 455/74, 90.3, 95, 455/99, 100, 569.1, 569.2, 573, 575.1, 575.2; 379/420.02, 420.03, 420.04, 426, 440, 449, 379/446, 447, 454, 455; 248/200; 235/462.43

(56) References Cited

U.S. PATENT DOCUMENTS

| | | | | |
|---|---|---|---|---|
| 4,935,742 A | * | 6/1990 | Marin ........................... | 342/13 |
| 5,261,121 A | * | 11/1993 | Hashimoto ................ | 455/550.1 |
| 5,305,381 A | | 4/1994 | Wang et al. ................. | 379/455 |
| 5,659,887 A | * | 8/1997 | Ooe ........................... | 455/575.9 |
| 5,754,962 A | * | 5/1998 | Griffin ...................... | 455/569.2 |
| 5,995,622 A | * | 11/1999 | Roussy et al. ............... | 379/446 |
| 5,996,956 A | * | 12/1999 | Shawver ................... | 248/309.1 |
| 6,002,765 A | * | 12/1999 | Frank ......................... | 379/446 |
| 6,043,626 A | | 3/2000 | Snyder et al. ............... | 320/113 |
| 6,141,569 A | * | 10/2000 | Weisshappel et al. ........ | 455/572 |
| 6,208,734 B1 | * | 3/2001 | Ortscheid et al. ........... | 379/446 |
| 6,229,893 B1 | * | 5/2001 | Chen .......................... | 379/454 |
| 6,344,727 B1 | * | 2/2002 | Desai et al. ................. | 320/107 |
| 6,389,302 B1 | * | 5/2002 | Vance ........................ | 455/567 |
| 6,634,494 B1 | * | 10/2003 | Derr et al. ................... | 206/305 |
| 6,639,561 B2 | * | 10/2003 | Pruss et al. ................. | 343/702 |

OTHER PUBLICATIONS

QRG: VCD 7500, Symbol Technologies, Inc., 2000, p. 1-41.

* cited by examiner

*Primary Examiner*—William Trost
*Assistant Examiner*—James D. Ewart
(74) *Attorney, Agent, or Firm*—Amin & Turocy, LLP

(57) ABSTRACT

The present invention relates to a system and methodology to enable efficient storage and handling of hand held devices and conveniently provide access to information within the devices. Single-handed storage and removal features enable users to insert and remove the device into and from a multifunctional cradle. The cradle mitigates device damage by limiting device movement and/or vibration once accepted into the cradle. One or more auxiliary storage compartments that feature single-handed component storage and removal can be included with the cradle. Functional segmentation of the cradle enables interface components within the cradle to be isolated from regions that can be exposed to contamination. The cradle includes operative connections for devices stored in the cradle to facilitate operations, such as charging the device and exchanging or updating device information with other local and/or remote systems.

29 Claims, 6 Drawing Sheets

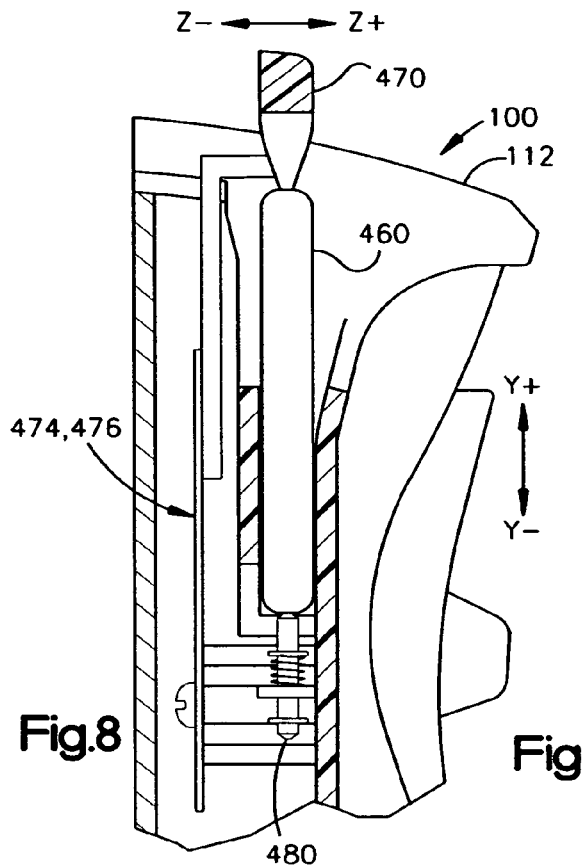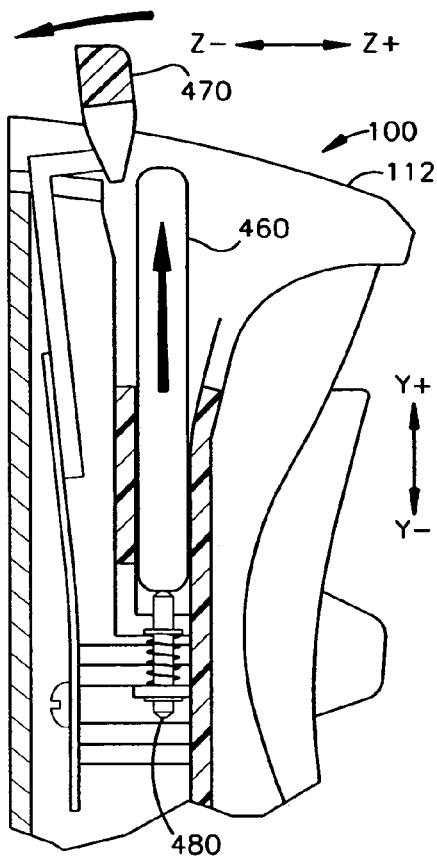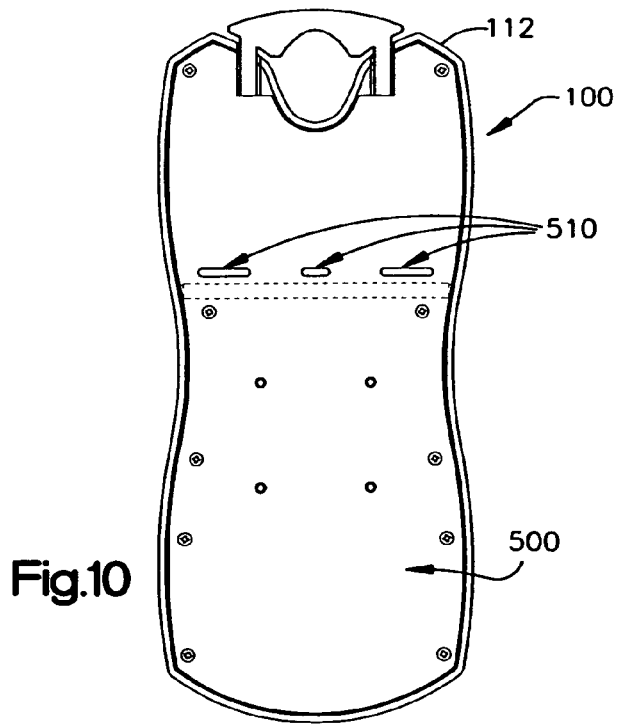

VEHICLE CRADLE SYSTEM AND METHODOLOGY FOR HAND HELD DEVICES

TECHNICAL FIELD

The present invention relates generally to hand held computer and/or communication systems, and more particularly to a system and method to facilitate robust and efficient storage, retrieval, and information access of hand held devices in mobile applications.

BACKGROUND OF THE INVENTION

Technological advancements in computer and communications devices have resulted in the decrease in size of electronics packaging. This has become apparent as many devices that once occupied larger spaces and were stationary are now commonly utilized in mobile applications and are carried in a person's pocket or in a vehicle. Cell phones, personal computing devices, and other electronic devices are routinely employed to conduct business or personal transactions when device users are away from work or home; these transactions often occur while users are on the road. Once the transactions are completed and the devices are no longer in use, there often is a need to store such devices. The device can be placed in a partially secure holder or other storage medium, such as a cup holder or other compartment of a vehicle, wherein the device resides until needed in the future.

The devices described above can be prone to damage while in a vehicle. Furthermore, depending on the storage technique employed, the actions of storing and retrieving these devices can increase the driver's chances of mishap. For example, if a hand held computing or communications device is improperly stored, the device can become dislodged due to vehicle vibrations, bumps in the road, or accelerations around a bend. This often results in damage to the device, including damage from shock if the device falls out of or is dropped from a storage location. In addition, depending on how the devices are stored, they can be prone to damage resulting from exposure to contaminants, such as beverage spills, dirt, and dust.

Other problems can occur during storage and/or retrieval of the devices described above and can present more serious issues for the driver. One such problem relates to the amount of attention and/or dexterity required on behalf of the driver to secure the device for storage or to remove the device when access is desired. Often times, two hands are required to place the device in a storage location and/or retrieve the device from the storage location. Sometimes, this can include using both hands to snap or undo hard-to-find latching mechanisms that can distract the driver from the task at hand. Furthermore, it is common for users to conduct business while traveling using more than one device, such as a cell phone and a hand held computer. In order to efficiently conduct such business, it is often necessary to temporarily place one or more of the devices in a holding or storage location before regaining access and control of the device. If such devices are difficult to store and retrieve, the utility of conducting such business can be diminished.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate storage and retrieval of hand held devices or terminals in mobile and/or other applications. This is achieved by providing a multifunctional cradle that accepts a plurality of devices, such as inventory systems, computing systems, and cell phones. The cradle facilitates both robust storage and efficient retrieval of the device by substantially inhibiting device movement and therefore mitigating device damage due to shock and vibration. The cradle provides convenience by allowing users to store and remove the device with one hand while facilitating secure storage of the device in the cradle.

Single-handed operation minimizes distraction to the driver when storing and retrieving devices and encourages the driver to place devices in the cradle when not in use, which further protects the device. Other functional aspects of the cradle include providing segmentation between electrical and mechanical portions of the cradle, thereby isolating sensitive portions of the cradle from second order effects, such as contamination. Moreover, higher order functionality is provided for the device, including communications to remote systems, device data transmissions, and device charging, all via operative connections within the cradle. Auxiliary component compartments in the cradle, such as those for storing/charging a spare device battery, can also be provided. Single-handed storage and retrieval of these components in their respective compartments is also provided.

In accordance with one aspect of the present invention, an upper housing and lower housing, or collectively the main body of the cradle, accept the device and limit its movement in multiple degrees of freedom. The degrees of freedom consist of right, left, up, down, out, and in (X+, X−, Y+, Y−, Z+, Z−, respectively) in accordance with how the device is referenced to the cradle. Single-handed insertion and removal of the device along the final degree of freedom can be achieved by utilizing a retaining and inhibiting feature. For example, a latch or other component can be employed such that when it is in a first position, it enables the device to be inserted into the housings. When the latch is in a second position, it inhibits device movement in the final degree of freedom, thereby retaining the device in the cradle in a substantially secure manner.

The lower housing and upper housing facilitate vehicle or other type mounting of the cradle and provide for various electrical and mechanical aspects of the present invention. A mechanical compartment is provided that includes an auxiliary storage area for additional components related to the device (e.g., spare battery, fuse, replaceable device components). The additional components can be inserted via a single-handed push operation and conveniently removed with concurrent single-handed release and eject operations. The mechanical compartment provides access to and facilitates movement of the above storage/release mechanisms for the device and auxiliary components, while it mitigates potential effects from contamination, such as moisture and debris. For example, providing drainage ports within a lower portion of the mechanical compartment enables liquid and debris that enter into the compartment to exit the cradle.

An electrical compartment in the lower housing section is separated from the mechanical compartment by moisture resistant barriers between the compartments. In this manner, sensitive electronics operative within the cradle are isolated from potential contaminants that may enter the mechanical compartment. The electronics within the electrical compartment can include interface aspects to other systems and can facilitate various device operations. For example, when the device is accepted into the upper and lower housings, an operative coupling can be supplied that links the device to interface circuitry in the electrical compartment. The operative coupling can supply power to the device, interface signals that interact with the device, and device battery charging. Furthermore, if the device were employed to collect data when not in the cradle, the data within the device can be collected or retrieved by the cradle and transmitted via a modem or other type interface to other systems that are remote to the cradle, device, and/or vehicle. One or more external cradle interface ports that allow for accessing the electronics and/or updating/accessing information within the device can also be provided.

The following description and the annexed drawings set forth in detail certain illustrative aspects of the invention. These aspects are indicative, however, of but a few of the various ways in which the principles of the invention may be employed, and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 8 is a diagram illustrating an auxiliary component storage and removal in accordance with an aspect of the present invention.

FIG. 9 is a diagram illustrating an auxiliary component removal in accordance with an aspect of the present invention.

FIG. 10 is a diagram illustrating a back view of a vehicle cradle in accordance with an aspect of the present invention.

DETAILED DESCRIPTION OF THE INVENTION

The present invention relates to a system and methodology that enables efficient storage and handling of hand held devices and provides convenient access to information within the devices. Single-handed storage and removal capabilities allow users to easily insert and remove the device into and from a multifunctional cradle. The cradle mitigates device damage by limiting movement and/or vibration of the device when stored in the cradle. Other features include providing one or more auxiliary storage compartments that also feature single-handed storage and removal of device-related components. Functional segmentation of the cradle enables sensitive components within the cradle to be isolated from areas that can be exposed to contamination. Regions of the cradle that can be exposed to such contamination include venting features that facilitate removal of the contamination. The cradle can also include operative couplings for devices stored in the cradle in order to allow for operations such as charging the device and exchanging device information with other local and/or remote systems.

Figure 1:
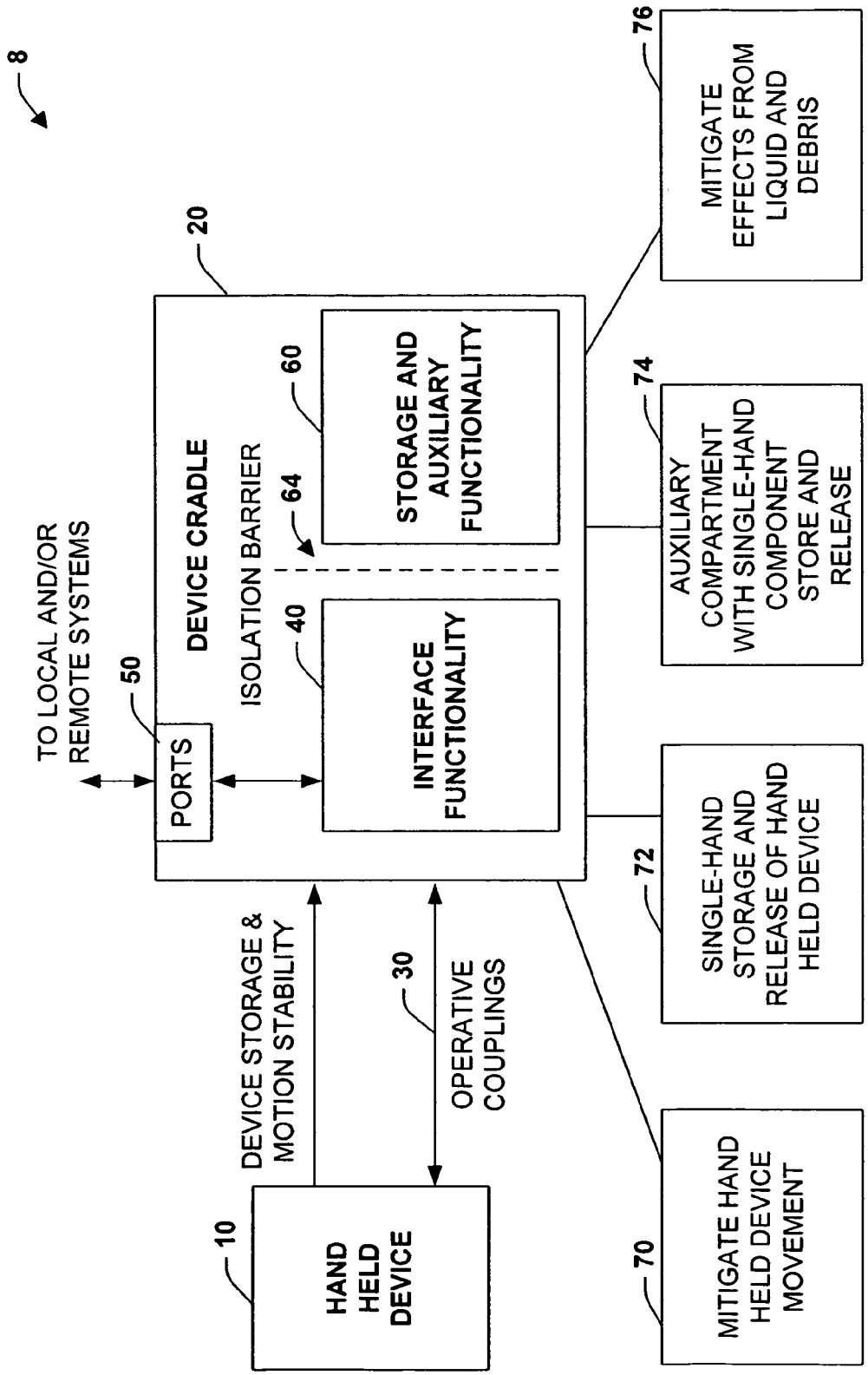
FIG. 1 is a schematic block diagram illustrating a vehicle cradle's architecture in accordance with an aspect of the present invention.

Referring to FIG. 1, a vehicle cradle architecture 8 is illustrated in accordance with an aspect of the present invention. A hand held device 10 is received by a device cradle 20 that provides storage and motion stability for the device. The device cradle 20 can be mounted in a vehicle (not shown), wherein the hand held device 10 can be substantially protected from shock and/or vibration. The hand held device 10 can be an inventory system, for example, wherein data is collected from a plurality of sources in accordance with the travels of a vehicle (e.g., vehicle operator stops at a number of locations and retrieves inventory data from the locations).

Operative couplings 30 are provided from the hand held device 10 to an interface 40 associated with the cradle 20. The data from the device 10 can be loaded to the interface module 40 and/or can be subsequently or concurrently transmitted by the interface 40 to one or more remote ports 50. The remote ports 50 can interface to a plurality of local and/or remote systems (not shown) that can communicate with the interface 40 (e.g., local/remote server receiving downloaded data via a network connection). The hand held device 10 can include other type functionalities. For example, cell phones, Personal Digital Assistants (PDA), or other mobile computing/communications devices can be similarly employed. The device cradle 20 also provides a segmented architecture, wherein a mechanical compartment 60 provides storage and removal functionality for the hand held device 10 and can include auxiliary functions such as storage, insertion, removal, and/or charging of auxiliary component(s) (e.g., battery or replacement component). An isolation barrier 64, which is described in more detail below, is provided between the interface 40 and the mechanical compartment 60 in order to mitigate contaminants from entering the interface portion of the device cradle 20 via the mechanical compartment.

In accordance with the present invention, the device cradle 20 provides a variety of features. At 70, the cradle 20 mitigates hand held device 10 movements when it is stored in the cradle. This can be achieved by limiting device movements in multiple degrees of freedom as described in more detail below. At 72, single-handed storage and release functionality is provided for the hand held device 10, helping an operator store and remove the device in the cradle. At 74, auxiliary component storage that can include the single-handed storage and release of auxiliary components, such as a battery, is provided. At 76, the device cradle 20 is designed to mitigate the effects from contaminants, such as liquid and debris. As will be described in more detail below, this can include the aspects of the isolation barrier 64 and can include providing one or more exhaust ports that facilitate the removal of contamination from the mechanical compartment 60.

Figure 2:
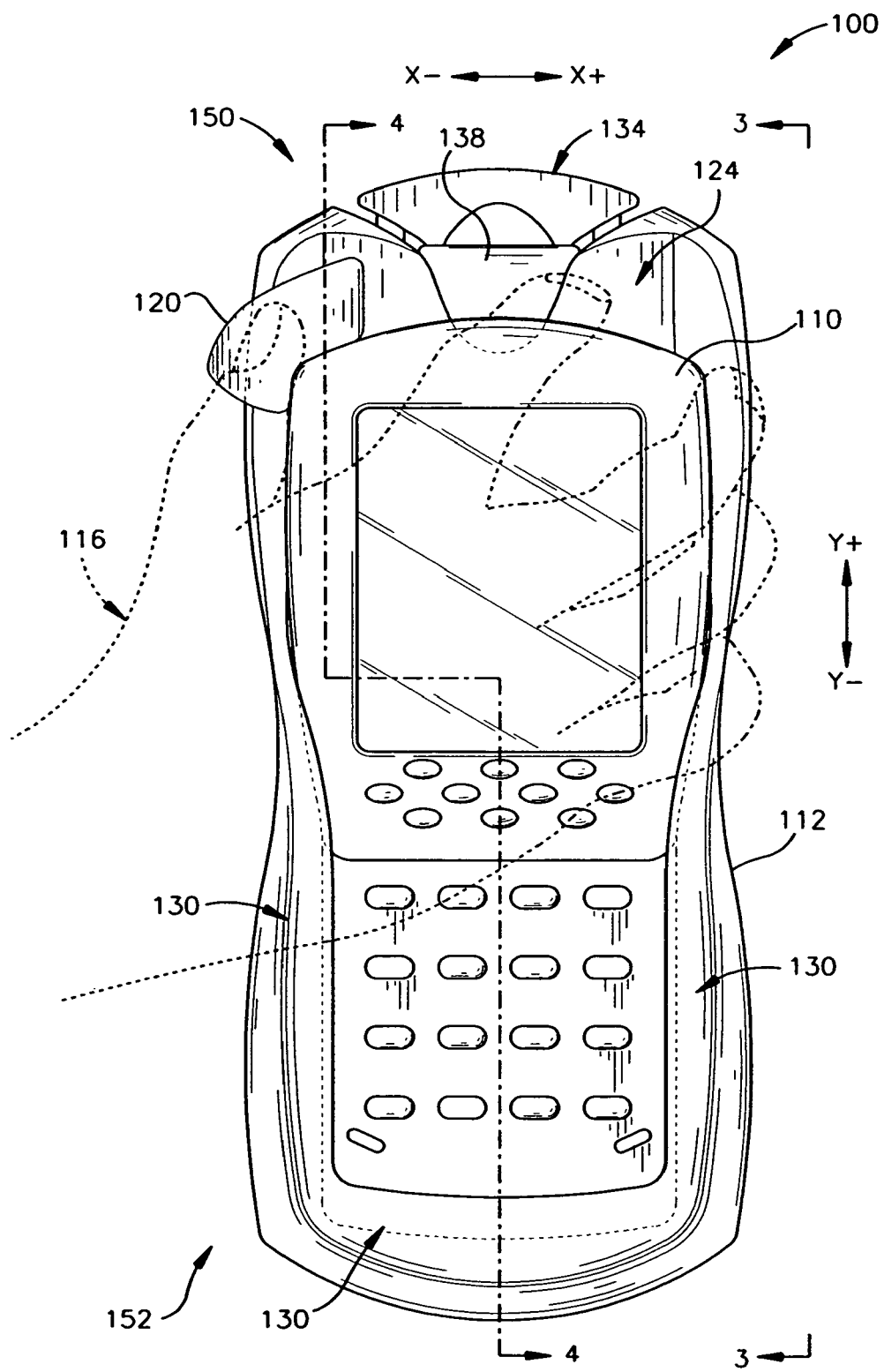
FIG. 2 is a diagram illustrating a front view of a hand held device and vehicle cradle in accordance with an aspect of the present invention.

Referring to FIG. 2, a system 100 illustrates a front view of a hand held device 110 (also referred to as the device) and vehicle cradle 112 (also referred to as the cradle) in accordance with an aspect of the present invention. For illustrative purposes, a hand 116 is depicted in a position of placing the hand held device 110 into the vehicle cradle via depression of a latch 120. When the device 110, a thumb, or other digit on the hand 116 depresses the latch 120, the hand held device 110 can be inserted into the vehicle cradle 112 in a direction depicted as Y−. The latch 120 can be spring-loaded such that when the latch is released, it prohibits movement of the hand held device 110 in the Y+ direction. The vehicle cradle 112 is constructed such that motion of the hand held device 110 relative to the cradle 112 is substantially restricted when the device is placed into the cradle. This can be achieved by employing the cradle to substantially prevent hand held device movement in multiple degrees of freedom and utilizing the latch to restrict the device's final degree of freedom. In this manner, single-handed access of the device 110 is facilitated since the device can be inserted into and removed from the cradle 112 via concurrent motions of the device 110, hand 116, and thumb.

The vehicle cradle includes a base portion 124 that can be contoured in a shape similar to the hand held device 110, thereby facilitating insertion and removal of the device 110 into and from the cradle 112. The base portion 124 restricts movement of the device in a Z− direction (direction from device toward the base), and overlapping portions 130 affixed to the base portion 124 are included to help restrict device movements in the Y−, Z+, X+, and X− directions. The overlapping portions 130 in conjunction with the base 124 operate as a cradle, or receiver, to hold and store the device 110. The latch 120 is employed to substantially restrict the final degree of freedom when the device is stored in the cradle. When the latch 120 is in a depressed position, an opening is created in the vehicle cradle 112, wherein the hand held device 110 can be inserted in the Y− direction or removed in the Y+ direction. After insertion of the device 110, the latch 120 can be released and employed to prohibit device movement in the Y+ direction by blocking the opening. The latch 120 surfaces that contact the device 110 when locked in the cradle 112 can be contoured to match the mating device surfaces in order to substantially restrict device movement in the Y+ direction. Furthermore, the latch 120 can be contoured to the shape of the thumb to ease depression and release of the latch. A second latch 134, which is described in more detail below, can be included as part of a storage compartment (See e.g., FIG. 8) and can be employed to provide single-handed storage and release of an auxiliary component, such as a battery 138.

As noted above, the device 110 is securely held in the vehicle cradle 112 during substantial shocks and vibrations. The base portion 124 and overlapping portions 130 act to restrict movement of the device 110 in five of the six degrees of freedom. The device 110 is inserted into and removed from the cradle 112 along the final degree of freedom, which lies on the Y axis. The latch 120, which restricts this last degree of freedom, translates along the Z axis, which is perpendicular to the Y axis. Since the latch 120 moves in a direction perpendicular to the direction the device 110 is inserted into or removed from the cradle 112, the latch can securely hold the device in place during shocks and/or vibrations. If, for example, the system 100 is shocked in a Y+ direction, the device 110 will attempt to eject from the cradle 112 in the Y+ direction. However, since the latch 120 generally cannot move in the Y+ direction, it effectively holds the device 110 in place. If the system 100 is shocked in a Z− direction (See e.g., Z−in FIG. 3), the latch 120 will exert a force against a spring (See e.g., spring 300 in FIG. 4) and attempt to move in the Z− direction. If the latch 120 moves in the Z− direction, the device 110 will also attempt to move in the Z− direction. However, since the device 110 moves in the Y+ direction to be removed from the cradle 112, the device will not eject from the cradle.

The vehicle cradle 112 and associated latches and compartments can be constructed from various materials. It is noted, however, that the materials should be substantially resistant to damage from shock and vibration that can be encountered during road travels. For example, the base portion 124, and overlapping portions 130 can be molded from a commercially available material such as Bayer Bayblend FR110 PC/ABS or other material. The latch 120 can be molded from GE Lexan WR2210 PC or other material, and the latch 134 can also be molded from Bayer Bayblend FR110 PC/ABS or other material.

The system 100 provides a housing for the device 110 and at least two sidewalls (e.g., overlapping portions 130) that are affixed to the base 124 and extend generally perpendicular from the base 124. The housing extends between two ends 150 and 152 spaced apart from each other, and an opening is located near the end 150. One of the ends can be dimensionally configured to receive the hand-held device 110 along a direction generally parallel to the Y axis. The latch 120 is located near the opening and can move along the Z axis between a first position and a second position. In the first position, the upper surface of the latch 120 is mostly embedded in the base 124, facilitating insertion and removal of the hand held device 110. In the second position, the upper surface of the latch 120 extends from the base 124, generally prohibiting device movement in the Y+ direction.

Figure 3:
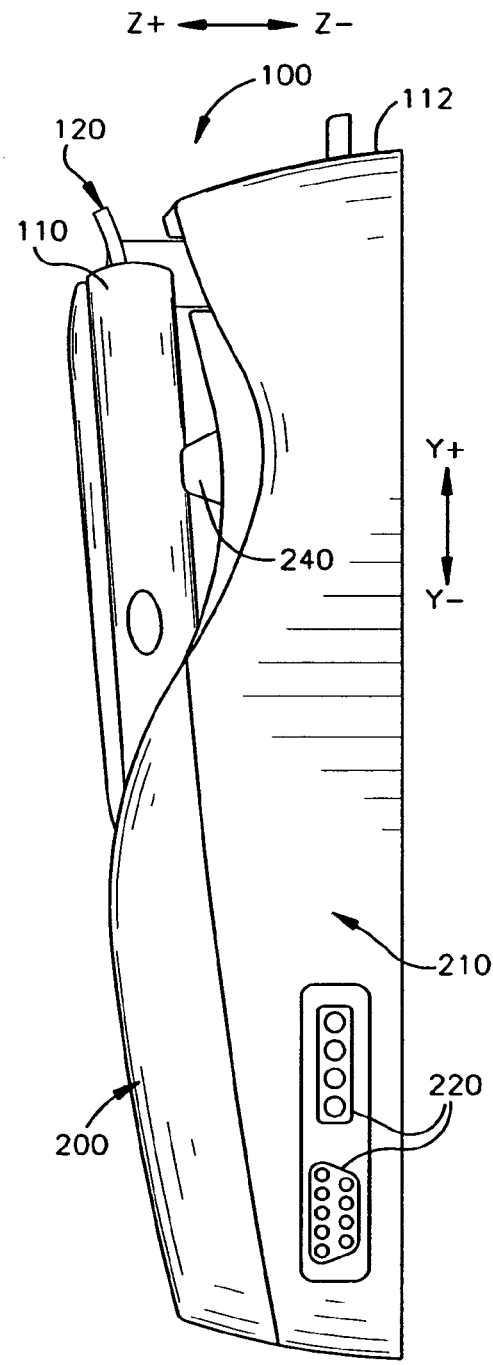
FIG. 3 is a diagram illustrating a side view of a vehicle cradle in accordance with an aspect of the present invention.

Turning to FIG. 3, a side view of the system 100 is illustrated in accordance with an aspect of the present invention. The hand held device 110 is depicted in the storage position, wherein the latch 120 is in a Z+ position, locking the device and substantially preventing its movement during storage. The cradle 112 can include an upper housing section 200 to accept the device 110 and a lower housing section 210 that contains one or more compartments that are described in more detail below and include electrical, mechanical, and auxiliary aspects of the invention. One or more tab features 240 that further mitigate movement of the device 110 can be incorporated in the lower housing section 210. Interface ports 220 (e.g., Molex, d-shell, BNC, Ethernet, other network or optical connectors) are included to enable the hand held device 110 to interface to one or more remote systems (not shown) while the device is stored. This can include transferring data to/from remote system(s) and communicating with the device 110 during storage.

Figure 4:
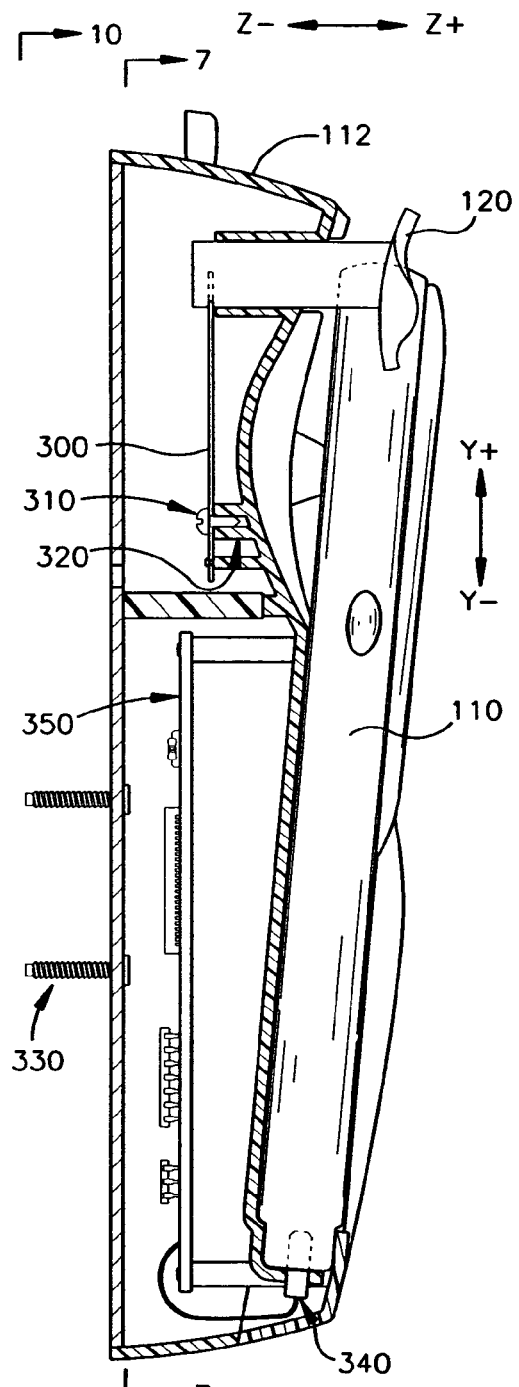
FIG. 4 is a diagram illustrating a sectional view of a vehicle cradle in accordance with an aspect of the present invention.

Referring to FIG. 4, a diagram illustrates a section view of the vehicle cradle 112 taken along line 4—4 of FIG. 2. The latch 120 is coupled to a leaf spring 300 that forces the latch in the Z+ direction when an actuation force is removed from the latch. The leaf spring 300 can be coupled to the lower housing section 210 with a screw 310 and associated boss 320 that accepts the screw. The leaf spring 300 can be similarly riveted into the lower housing section 210. Bolts or studs 330 are provided for mounting the cradle to a vehicle (not shown). A connector and associated cable 340 are provided to enable the hand held device 110 to communicate with a processing module 350 (described below). The processing module operates in conjunction with the connectors 220 described above to communicate and exchange data with remote system(s). It is also noted that the connector and cable 340 can provide other aspects in accordance with the present invention, such as providing the link to connections that charge the device 110 during storage.

Figure 5:
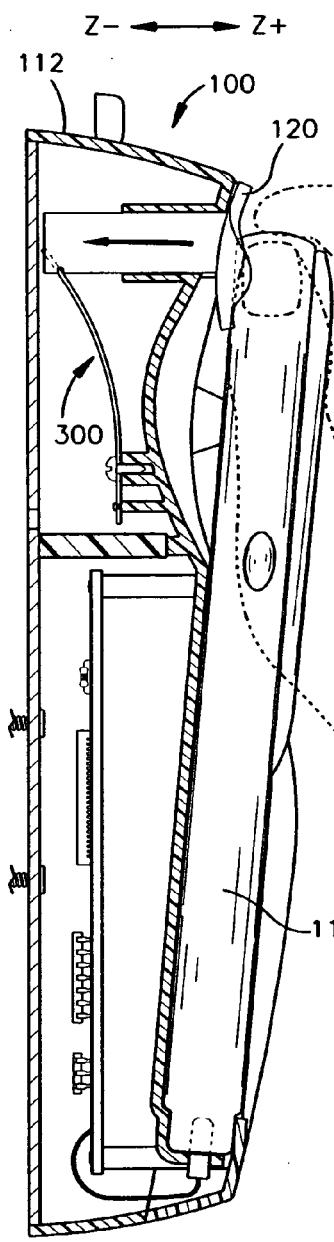
FIG. 5 is a diagram illustrating a hand held device insertion into a vehicle cradle in accordance with an aspect of the present invention.
Figure 6:
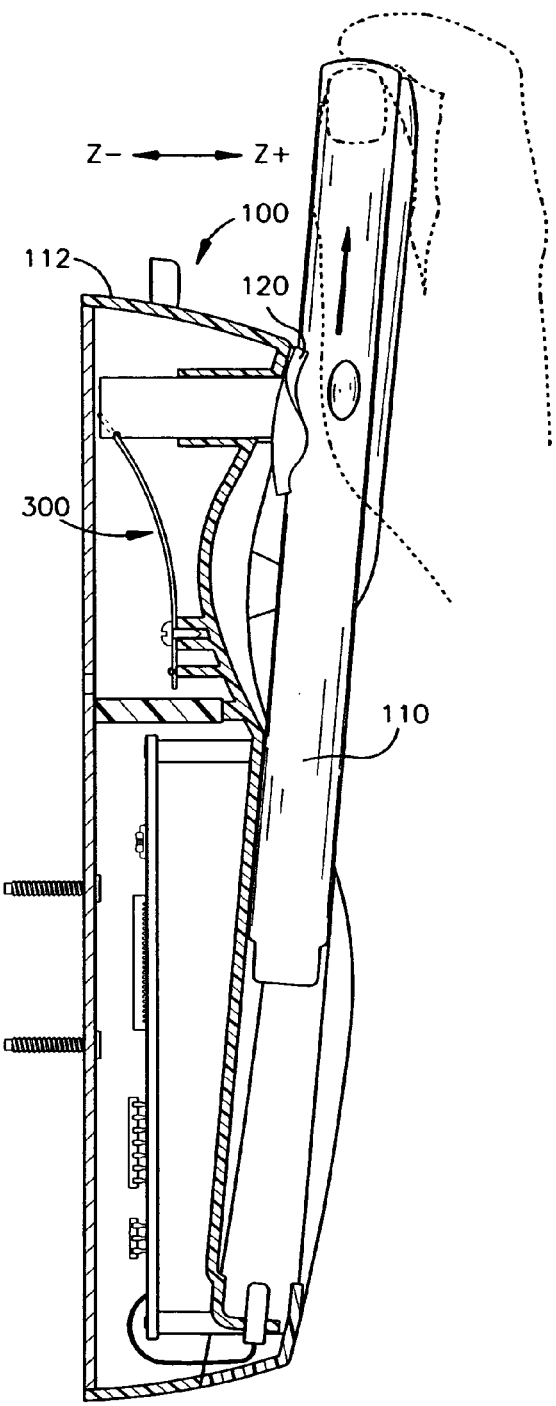
FIG. 6 is a diagram illustrating a hand held device removal in accordance with an aspect of the present invention.

Referring to FIGS. 5 and 6, insertion and removal of the hand held device 110 in association with the vehicle cradle 112 is illustrated in accordance with an aspect of the present invention. FIG. 5 illustrates the depression of the latch 120 in the Z− direction and leaf spring 300 during insertion of the device 110. As the device 110 slides past the latch 120, the leaf spring 300 exerts a force on the latch in the Z+ direction such that when the device is seated in the cradle 112, the latch is positioned in front of the device. FIG. 6 shows the hand held device 110 sliding over the latch 120 during its removal from the cradle 112. As noted above, the latch 120 can be contoured to the shape of the device 110, thereby facilitating a smooth and easy insertion and removal of the device.

Figure 7:
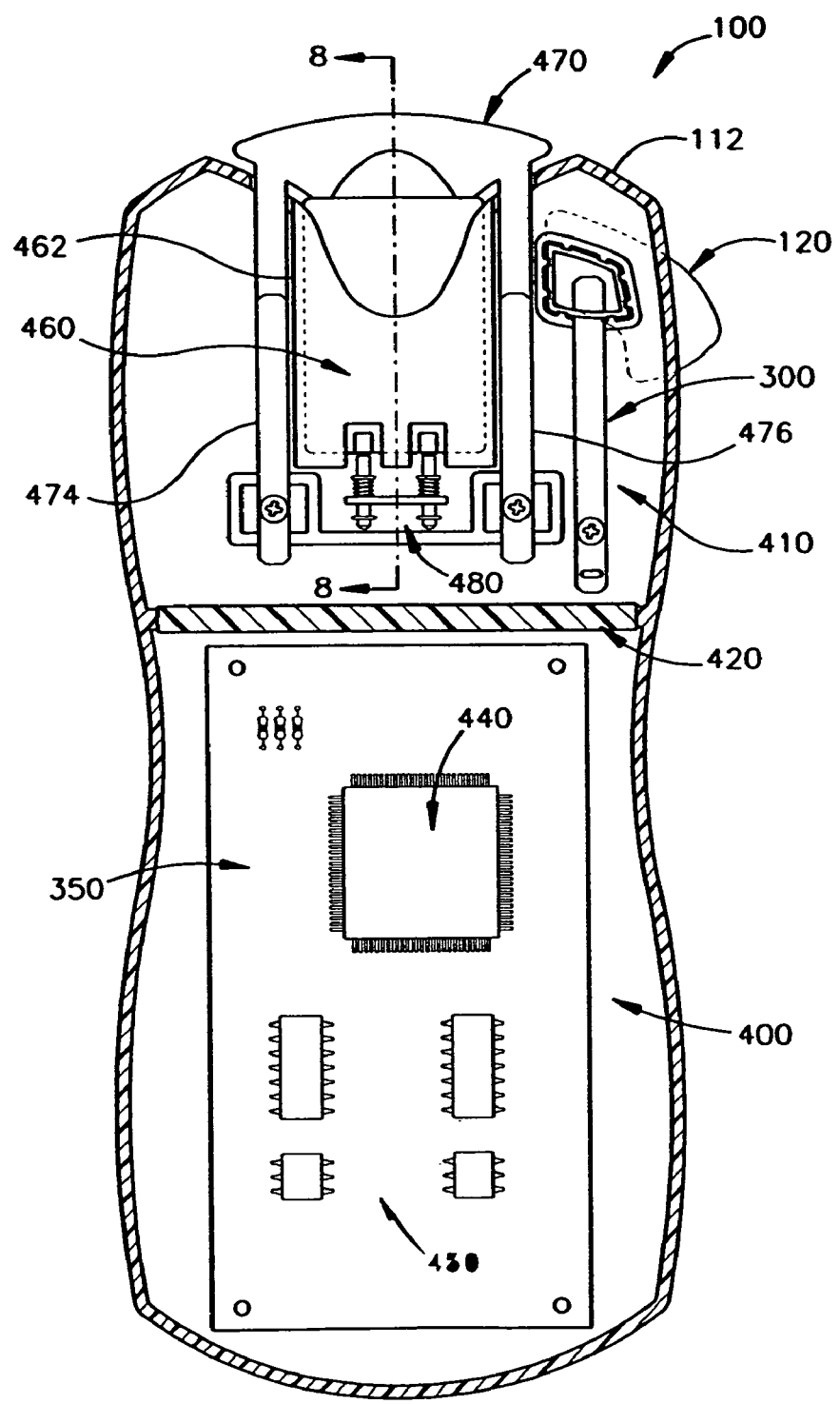
FIG. 7 is a diagram illustrating an interior view of a vehicle cradle in accordance with an aspect of the present invention.

FIG. 7 is a diagram illustrating an interior view of the vehicle cradle 112 in accordance with an aspect of the present invention. An electrical compartment 400 is isolated from a mechanical compartment 410 by a sealing barrier and associated grommet 420. This grommet can be manufactured from GLS Dynaflex G6730, for example. The isolation barrier and grommet 420 minimize the level of contaminants that may enter the mechanical compartment 410 from subsequently contaminating the electrical compartment 400. The electrical compartment 400 includes the processing module 350 that includes a processor 440 and associated memory and circuitry 450. The processor 440 is adapted to interface and communicate with the device 110 and the interface ports 220 to one or more remote systems.

The mechanical compartment 410 can include a spare battery compartment 462 or another compartment for an associated device component. A latch 470 is provided to lock the battery 460. This latch 470 can be coupled to leaf springs 474 and 476. Spring-loaded charging contacts 480 allow for the charging and removal of the battery 460, which is described in more detail below. FIG. 7 also depicts the latch 120 and leaf spring 300 described above. The leaf springs 300, 474, and 476 can be fabricated from any material that allows the springs to flex and provides a suitable actuation and locking force. For example, the leaf springs can be constructed from Type 301 Full Hard Spring Tempered Stainless Steel Strip.

FIGS. 8 and 9 illustrate the storage and removal of a spare battery 460 in accordance with an aspect of the present invention. In FIG. 8, the spare battery 460 is in the storage and charging position. The latch 470 and springs 474 and 476 hold the spare battery in position. Spring-loaded charging contacts 480 contact the spare battery 460 and provide charge during battery storage. To remove the spare battery 460, the latch 470 is depressed in a Z− direction as depicted in FIG. 9. The spring-loaded charging contacts 480 then force the spare battery 460 in a Y+ direction away from the cradle 1112. The latch 470 and the contacts 480 cooperate to facilitate the single-handed removal of the spare battery from the cradle 112. The spare battery 460 can be inserted in the Y− direction by sliding it over the latch 470.

Referring to FIG. 10, a back view of the vehicle cradle 112 is illustrated in accordance with an aspect of the present invention. The lower housing section 210 described above can be coupled to a base or vehicle mounting plate 500. The mounting plate can be screwed, riveted, or molded to the lower housing section 210 and can be constructed out of any commercially available and durable material, such as steel (e.g., cold rolled, zinc plated), aluminum, or high strength plastic. The mounting plate includes one or more drainage ports 510. Liquid and debris in the mechanical compartment 410 described above can leave the cradle 112 through these ports. In this manner, if contaminants, such as dust or a spilled beverage, enter the mechanical compartment, the ports 510 can act as an exhaust mechanism to prevent the build-up of contaminants in the compartment.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A storage system for a hand-held device, comprising:
a housing having a base and at least two sidewalls extending perpendicular from the base, the housing extending between two ends spaced apart from each other,
an axis extending from one end of the housing to the other, the housing having an opening at one of the ends dimensionally configured to receive the hand-held device along a direction parallel to the axis with the hand-held device inserted at a slight angle; and
a latch located near the opening, the latch having an upper surface movable relative to the base between a first position and a second position utilizing a spring;
in the first position, the upper surface movable perpendicular to the base to facilitate insertion and removal of the hand-held device;
the latch is depressed toward the base to allow at least one of an insertion and removal of the hand-held device;
in the second position, the upper surface being spaced from the base in a direction that the sidewalls extend from the base, the upper surface restricts movement of the hand-held device in a direction parallel to the base.

2. The system of claim 1, the upper surface of the latch is generally contoured in accordance to the shape of the hand held device to promote insertion and removal of the device.

3. The system of claim 1, the upper surface of the latch is contoured in the shape of a thumb.

4. The system of claim 1, the latch is spring loaded to facilitate movement of the latch from the first position to the second position.

5. The system of claim 1, the housing is employed to mitigate shock and vibration of the hand held device in multiple degrees of freedom during storage of the device.

6. The system of claim 1, the base further comprising of a mechanical compartment and an electrical compartment, the mechanical compartment providing an operating region for the latch, the electrical compartment providing an interface for the hand held device.

7. The system of claim 6, the interface including a processor and associated memory and circuitry adapted to transfer data from the hand held device to at least one of the base and a remote system.

8. The system of claim 7, the base having one or more interface ports operatively coupled to the interface and adapted to communicate to the remote system.

9. The system of claim 6, the electrical compartment and mechanical compartment are isolated via a sealing barrier and a grommet to mitigate contaminants being transferred to the electrical compartment.

10. The system of claim 6, the interface enables charging of the hand held device.

11. The system of claim 6, the mechanical compartment further comprising a storage compartment for storing at least one of a battery, a fuse, and a replacement component associated with the hand held device.

12. The system of claim 11, the storage compartment including a charging component having at least a charging contacts for the battery.

13. The system of claim 12, the charging components are spring-loaded to facilitate removal of the battery.

14. The system of claim 13, the storage compartment further comprising a spring-loaded latch that cooperates with the charging contacts to facilitate insertion and removal of the battery.

15. The system of claim 6, the mechanical compartment and the base including one or more drainage ports to facilitate removal of contaminants from the compartment.

16. The system of claim 1, the base further comprising of one or more mounting studs to attach the storage system to at least one of a vehicle, a wall, and other object.

17. The system of claim 1, the hand held device is at least one of an inventory system, a cell phone, and a hand held computer.

18. A method to facilitate storage of a hand held device, comprising:
restricting movement of the hand held device in a housing according to multiple degrees of freedom;
providing an opening in the housing to permit storage and removal of the hand held device in the housing;
positioning a latch that is movable perpendicular to the housing in front of the opening when storing the hand held device in order to mitigate device movement in a final degree of freedom; and
depressing the latch toward the housing to allow at least one of an insertion and a removal of the hand held device.

19. The method of claim 18, further comprising interfacing to a remote system during storage of the hand held device.

20. The method of claim 18, further comprising charging the hand held device during storage of the device.

21. The method of claim 18, further comprising storing auxiliary components associated with the hand held device near the housing, the auxiliary components including at least one of a battery, a fuse, and a replacement component associated with the hand held device.

22. The method of claim 21, further comprising charging the battery.

23. The method of claim 22, further comprising force-loading charge contacts associated with the battery to facilitate storage and removal of the battery.

24. The method of claim 18, further comprising providing drainage ports to mitigate contaminants in the housing.

25. A system to facilitate storage of a hand held device, comprising:
means for restricting movement of the hand held device in multiple degrees of freedom;
means for permitting storage and removal of the hand held device in a housing;
means for latching the hand hold device utilizing a latch movement perpendicular to the base in order to mitigate device movement in a final degree of freedom, wherein the final degree of freedom is parallel to the base;
means for releasing the hand held device from storage utilizing the latch movement perpendicular to the base;
means for storing auxiliary components associated with the hand held device; and
means for removing the auxiliary component.

26. The system of claim 25, further comprising means for charging the auxiliary component.

27. A cradle for storing a hand held device, comprising:
a base unit to store the hand held device;
a mechanical compartment associated with the base unit, the mechanical compartment housing a latching component utilizing a latch movement perpendicular to the base unit that limits movement of the hand held device in a final degree of freedom, wherein the final degree of freedom is parallel to the base; and
an electrical compartment associated with the base unit and the mechanical compartment, the electrical compartment housing interface components that are isolated from moisture that enters the mechanical compartment via at least one of an isolation barrier and a grommet.

28. The cradle of claim 27, the mechanical compartment further comprising one or more drainage ports to exhaust the moisture that enters the compartment.

29. A cradle for storing a hand held device, comprising:
a base unit to store the hand held device, the base unit having sidewalls to limit movement of the hand held device according to multiple degrees of freedom; and
a latching component that limits movement of the hand held device in a final degree of freedom, wherein the final degree of freedom is parallel to the base unit, the latching component having an upper surface movable perpendicular to the base unit between a first position and a second position;
in the first position, the upper surface movable perpendicular to the base unit to facilitate insertion and removal of the hand held device in a singular motion;
in the second position, the upper surface being spaced from the base unit to mitigate shock and vibration of the hand held device by restricting the movement of the device in a direction parallel to the base unit.

* * * * *